Feb. 4, 1964   B. J. MIDLOCK ETAL   3,120,640
CASING AND SUPPORT FOR TRANSMITTER-RECEIVER
Filed Sept. 29, 1961   2 Sheets-Sheet 1
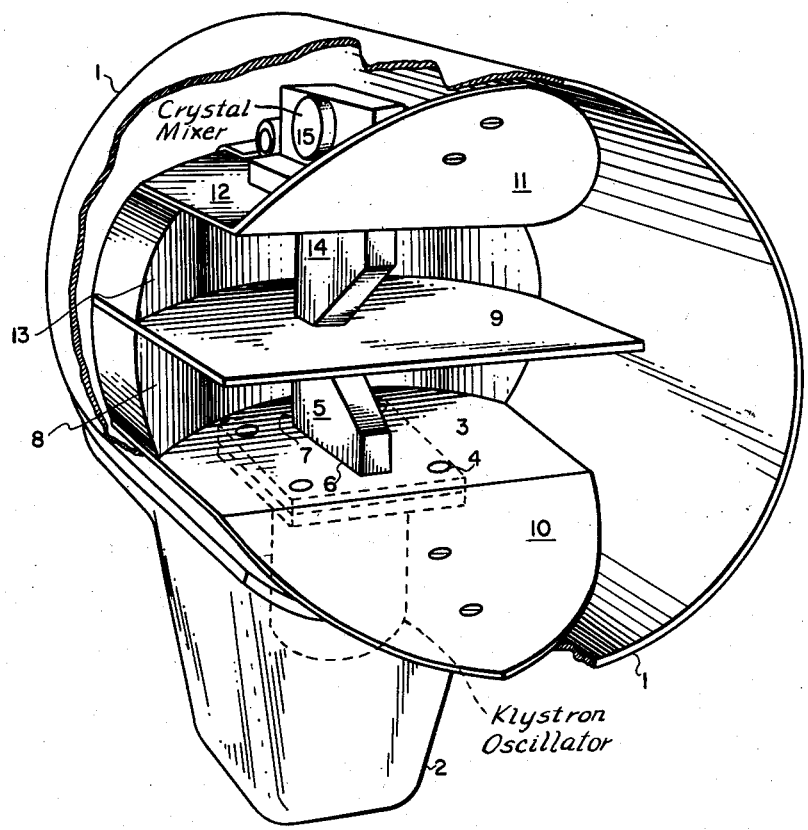
FIG. I
INVENTOR.
BERNARD J. MIDLOCK
&
BY   ARA M. BALTAYAN
Edward N. Caunce
ATTORNEY Feb. 4, 1964 B. J. MIDLOCK ETAL 3,120,640
CASING AND SUPPORT FOR TRANSMITTER-RECEIVER
Filed Sept. 29, 1961 2 Sheets-Sheet 2

INVENTOR.
BERNARD J. MIDLOCK
&
BY ARA M. BALTAYAN

ATTORNEY

United States Patent Office 3,120,640
Patented Feb. 4, 1964

3,120,640
CASING AND SUPPORT FOR TRANSMITTER-RECEIVER
Bernard J. Midlock, Norwalk, and Ara M. Baltayan, New Haven, Conn., assignors to Laboratory for Electronics, Inc., Boston, Mass., a corporation of Delaware
Filed Sept. 29, 1961, Ser. No. 141,665
2 Claims. (Cl. 325—16)

This invention relates to a novel casing and support for a transmitter-receiver and particularly to a transmitter-receiver casing which is designed to appear as a spotlight or siren on a vehicle and which is further adapted for convenient mounting on and removal from the window of a vehicle as well as for efficient transmission and reception of electrical energy.

This invention relates to a highly directive radar or ultra-sonic transmitter-receiver and particularly to one for detecting or measuring the speed of passing or approaching vehicles in which the transmitter-receiver casing is shaped to avoid its detection by passing motorists and in its preferred embodiment is adjustably mounted for rotation to direct the beam of energy and is supported by a U-shaped window support for convenient transfer from one vehicle to another.

The detection of the speed of passing vehicles by the use of radar or ultra-sonics is well known. Such systems utilize an antenna which is mounted above or to one side of the roadway or on a police car, for example. However, the public has become accustomed to these antenna structures even though they may be enclosed in radomes or other casings. Accordingly, a driver upon recognizing such an antenna will signal or otherwise warn other drivers such as by blinking his headlights thereby effectively decreasing the effectiveness of the radar speed detection apparatus.

To overcome this disadvantage, this invention provides a stainless steel or aluminum or chrome plated transmitter-receiver casing which has a shape or otherwise appears similar to a spotlight or siren and which may be mounted upon a police vehicle on the door, hood, window or roof or may be mounted in an inconspicuous position such as the grille so that it is not detected by passing motorists. Since spotlights and sirens are conventional equipment on police vehicles, a passing motorist will be unaware that his speed is being measured. Obviously there are many types of spotlights and sirens each having their own individual configuration of the component parts as is well known. One type of spotlight uses a casing having a rounded or conical end member which encloses a lamp and reflector while the other end has a lens for transmitting the light beam. While this invention encompasses all such forms, a preferred form of the invention utilizes a substantially cylindrical casing having one end closed with a round end member and the open end closed with a substantially flat adjustable polyethylene dielectric.

While the invention includes numerous mounting arrangements as suggested above, the preferred embodiment provides a radar transmitter-receiver which appears as a spotlight or siren and is connected to a U-shaped support by a bracket having an adjustable ball and socket joint. The U-shaped support permits convenient mounting on and removal from the window of a vehicle; the adjustable ball and socket bracket connection permits adjustment of the casing to direct the beam towards either approaching or receding vehicles or towards some central station as desired.

This particular window mounting support has advantages over a fixed installation since because of the cost of such transmitter-receiver units, municipalities find it difficult to provide one such unit for each police vehicle. Accordingly if the transmitter-receiver speed detection unit is fixedly mounted on a police car which becomes temporarily or permanently inoperative, it may be transferred to another police car only at a great expense and only after a certain time delay. Another advantage is that even if the public is informed that the new radar speed unit appears as a siren or spotlight, this information will not assist them in recognizing radar speed units since all police cars generally have such spotlights and sirens. It is highly possible therefore that the public will assume that each police car has a radar unit thereby resulting in much lower traffic speeds.

Accordingly it is an object of this invention to provide transmitter-receiver apparatus for mounting on the exterior of a vehicle while yet being concealed or deceptive in its appearance.

Another object is to provide a transmitter-receiver casing an apparatus mounted on the exterior of a vehicle for transmitting wave energy along a roadway and for receiving wave energy reflected from such vehicles in which the mounting permits the apparatus to be easily transferred from one vehicle to another.

A further object of this invention is to provide transmitter-receiver apparatus on the exterior of a vehicle which has a casing similar in appearance to the casing of other articles conventionally on the exterior of such vehicles and in which such apparatus is easily removable from the vehicle and the casing adjustable to vary the direction of the transmitted beam along the roadway.

These and further objects will be apparent from the following detailed disclosure of which:

FIG. 1 is a perspective view of our radar transmitter-receiver with part of the casing cut away.

FIG. 1 illustrates the transmitting and receiving waveguide members within a preferred form of spotlight type casing which has been partially cut away to show these elements, the open end of this casing is normally enclosed by a dielectric radome cover to appear as a lens.

Figure 3:
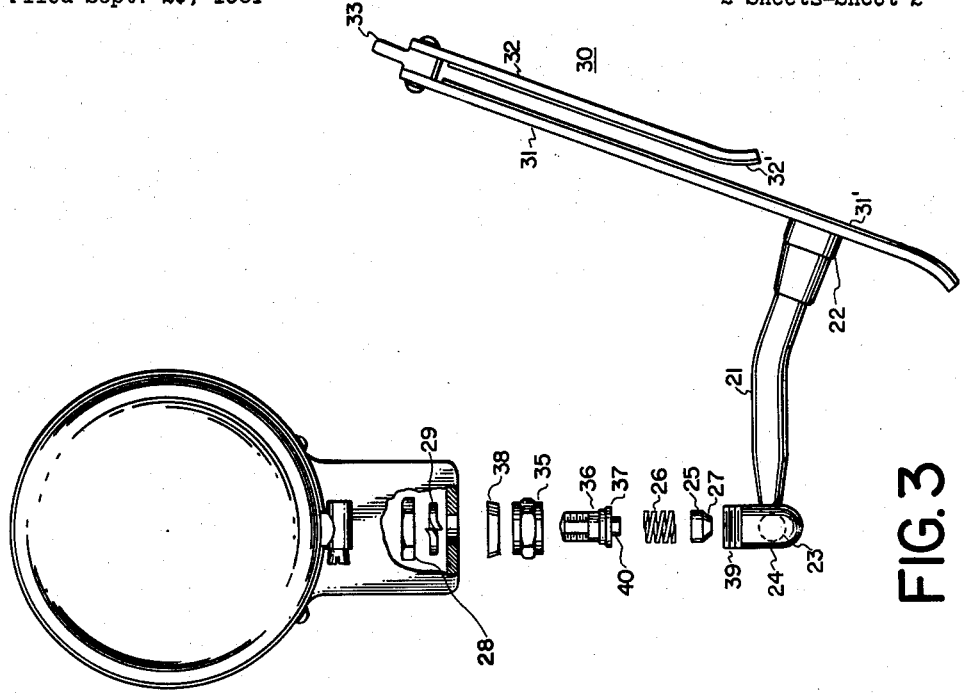
FIG. 3 illustrates a front view of the preferred connection of the casing to a bracket for support on a vehicle window.

A casing 1 of either aluminum, stainless steel, or chrome plate is generally cylindrical and has an open end at its front for the transmission and reception of high frequency energy of the order of 10,000 megacycles and is closed at the rear by a rounded end. A polystyrene or other insulating radome (not shown) encloses the open end without substantially affecting the radiation characteristics.

A handle 2 is connected to the casing 1 by bolts which permit their separation. Within the handle is a klystron oscillator shown in broken line form which is mounted on the underside of a conductive plate 3 by bolts 4; the casing 1 has a hole (not shown) for permitting this connection.

Vertically propagated high frequency waves radiated from the klystron oscillator are coupled through a hole in plate 3 into a 90 degree rectangular waveguide bend member 5 and pass out of this member at 7 as horizontally propagated and horizontally polarized from a reflector 8, which is a section of a parabolic surface in a narrow horizontal beam.

Parallel plates 3 and 9 are in contact with the walls of the casing (although this is not necessary) and serve as a waveguide channel for these reflected waves; thus the reflector 8, bend member 5 and plates 3 and 9 form a modified pillbox type antenna. The reflected waves pass down the waveguide and are guided by plates 10 and 11 which in cooperation with the walls of the casing serve as a tapered sectorial horn with plate 10 bending toward the roadway and plate 11 being away from the roadway. The horn 10 and 11 serves to match the characteristic impedance of the transmitting waveguide with the air so that a maximum amount of energy is transmitted while maintaining the horizontal character of the beam.

Parallel conductive plates 9 and 12 in cooperation with the casing form a receiving waveguide which guides waves received at the common sectorial horn. Horizontally polarized wave energy reflected from a vehicle passes horizontally through the horn 10 and 11 to the receiving waveguide 9 and 12 to the parabolic reflector 13 where it is reflected into a 90 degree waveguide bend 14 so that vertically propagated waves are supplied to a crystal mixer 15. This received wave energy has been shifted in frequency from the transmitted frequency in proportion to the speed of the detected vehicle.

In addition, some of the transmitted energy reflected at 8 bends upward around the end of plate 9 or is reflected from a radome covering at the open end of the casing into the receiving channel; this signal is mixed in the crystal 15 with the received reflected signal to provide a difference signal which is proportional to the speed of the detected vehicle. The output from the crystal rectifier may be connected to an amplifier and associated frequency responsive circuitry for providing a meter reading or graphic record in miles per hour for example in proportion to this frequency difference. For further details of the structure of FIG. 1, reference is made to U.S. application S.N. 59,757 filed on September 30, 1960 by Bernard J. Midlock for Apparatus for Vehicular Speed Measurements which is assigned to the assignee of this application.

Figure 2:
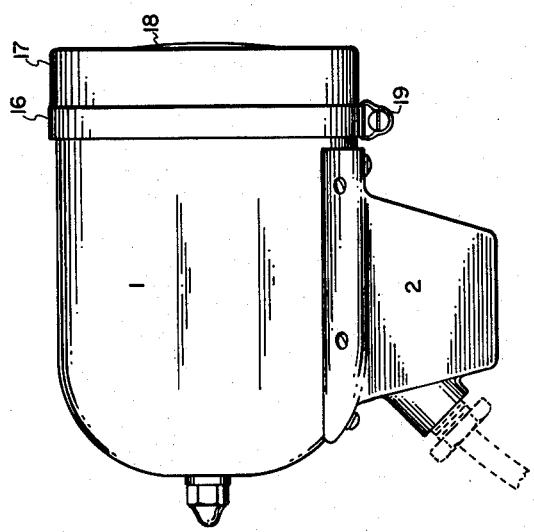
FIG. 2 is a side elevational view of the casing alone showing its generally cylindrical shape with one rounded closed end and a substantially flat dielectric clamped over the other end.

FIG. 2 is a side elevational view of the casing showing the elongated shape of cylinder 1 having a round closed end at the left. The open end of the casing at the right is enclosed by a dielectric cover which has a substantially flat surface 18 and a flange 17 which slides over the end of the casing. A substantially circular spring type clamp 16 fits over the flange and is tightened by screw 19 to hold the cover to the casing.

FIG. 3 illustrates the connection of the casing and its handle to an adjustable socket swivel bracket for mounting on a U-shaped support which fits over a vehicle window. The support 30 is U-shaped and includes two parallel steel or aluminum plates 31 and 32 which are separated by a spacer 33. The plate 31 is approximately 9¾ inches long while plate 32 is approximately 6 inches long thereby acting to distribute the stress over a large portion of the glass window to prevent cracking; both plates are 4 inches wide. Both plates have a felt or other cushioning material 31' and 32' glued or otherwise attached to one side. The distance between the two plates as determined by spacer 33 is substantially of the order of ¼" so that the arms fit over a vehicle window. The top portion of spacer 33 is thinner than its bottom portion so that when the window is rolled up with the apparatus attached, this portion will fit into the portion of the door at its top for normally retaining the window glass thus further preventing any rattling of the apparatus when the vehicle is in motion. The inner plate 32 is shorter than the outer plate and both plates are flared outward slightly at their bottom end to permit the bracket to be easily mounted on and removed from the window.

Figure 4:
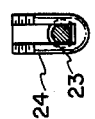
FIG. 4 illustrates the ball and socket connection.

An arm 21 has a fifteen degree bend and is connected to a flange or ball socket 24 which is attached to the support 30 by screws 22; the other end of the arm is tapered and terminates with rounded ball end at 23. Thus the ball end 23 of arm 21 is adapted to fit in the ball socket 24. In its preferred position the casing 1 is positioned with the parallel plates of FIG. 1 in a horizontal position. The fifteen degree bend in arm 21 thus serves to compensate for the fact that the average car window is at approximately fifteen degrees from the vertical. The ball socket 24 has a slot as shown in FIG. 4 for receiving and retaining the ball at 23.

A knuckle 25 and spring 26 are adapted to fit within the ball socket as shown in FIG. 3; the knuckle has a concave lower surface 27 to cooperate with the spherical surface of the ball 23 on arm 21. Therefore the amount of pressure applied by the spring 26 determines the friction between the ball and knuckle.

Within the handle 2 is a nut 28 and washer 29. A swivel nut 35 is provided whose function will now be described. A flanged screw 36 has a flange at 37; the threaded portion of 36 passes through swivel nut 35, washer 38, washer 29 and is connected with nut 28. The swivel nut 35 rides freely on flange 37 and is threaded at 39 to the ball socket 24. Thus as this union-type connection is made tighter, the flange portion 37 of screw 36 applies greater pressure to spring 26 and knuckle 25 and to the ball or arm 21; the extension of screw 36 at 40 merely serves to retain the relative position of the spring.

Thus the connection described above permits adjustment of the radar transmitter-receiver casing to any position with respect to the car window. In normal operation the police car will be stopped alongside the roadway with the transmitter-receiver adjusted to beam energy either back along the roadway to detect approaching cars or ahead to detect passing cars. In either case the beam must be accurately positioned to avoid obtaining reflections from vehicles in other than the desired traffic lane and to avoid large stationary objects. In addition the antenna must be adjusted so as to avoid large ground reflections. It has been found that the ball and socket adjustment permits the casing to be manually turned by hand even though the pressure applied is sufficiently great as to avoid a free movement of the casing by itself.

Accordingly this invention has provided apparatus which is easily mounted on or removed from a vehicle. Furthermore the apparatus is adjustable and has the further feature that with its aluminum casing it appears (at least from a distance) as a spotlight or siren. In addition it should be noted that in very hot climates police and other vehicles often use a form of air conditioning which includes cylindrical type apparatus mounted on the vehicle window.

Having read the foregoing disclosure it will be obvious to those skilled in the art that minor modification may be made in the casing, bracket and in their relative cooperation. Such equivalent modifications are considered within the scope of this invention which is accordingly defined in the following claims.

We claim:

1. A transmitter-receiver casing and support comprising a casing including a cylinder having a closed rounded end and an open end, reflector means within said casing at said rounded end, first, second and third substantially parallel conductive plates within said casing extending from said closed end toward said open end, and connected at said closed end to said reflectors, transmitter means within said casing for directing radio waves between said first and second plates toward said reflector, receiving means within said casing for receiving waves reflected from said parabolic reflector between said second and third plates, and adjustable bracket means for supporting said casing with the plates substantially parallel with the roadway for directing said radio waves in either direction along the roadway.

2. A combination as in claim 1 in which said reflector means includes first and second reflectors in which each reflector has a round surface formed by the intersection of a parabola by two parallel planes, and means connecting one of said reflectors between said first and second parallel plates and said other reflector between said second and third parallel plates so that individual pill box type antennas are provided for transmission and reception.

References Cited in the file of this patent

UNITED STATES PATENTS

| | | |
|---|---|---|
| 2,423,648 | Hansell | July 8, 1947 |
| 2,836,818 | De Virgilis | May 27, 1958 |

FOREIGN PATENTS

| | | |
|---|---|---|
| 1,203,227 | France | Jan. 15, 1960 |